US012052489B2

(12) United States Patent
Godghase et al.

(10) Patent No.: US 12,052,489 B2
(45) Date of Patent: Jul. 30, 2024

(54) VIDEO ANALYSIS AND MOTION MAGNIFICATION

(71) Applicant: Charter Communications Operating, LLC, St. Louis, MO (US)

(72) Inventors: Apurva Anil Godghase, Sunnyvale, CA (US); Hossam H. Hmimy, Aurora, CO (US); Hany A. Heikal, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 165 days.

(21) Appl. No.: 17/739,592

(22) Filed: May 9, 2022

(65) Prior Publication Data

US 2023/0362470 A1 Nov. 9, 2023

(51) Int. Cl.
*H04N 23/58* (2023.01)
*G06T 7/564* (2017.01)
*G06V 20/40* (2022.01)
*G06V 40/20* (2022.01)

(52) U.S. Cl.
CPC ............. *H04N 23/58* (2023.01); *G06T 7/564* (2017.01); *G06V 20/44* (2022.01); *G06V 40/20* (2022.01)

(58) Field of Classification Search
CPC .............. H04N 23/58; G06T 7/564; G06T 2207/20081; G06T 2207/20084; G06T 2207/30196; G06T 7/246; G06V 20/44; G06V 40/20; G06V 20/52
See application file for complete search history.

(56) References Cited

U.S. PATENT DOCUMENTS

| 2014/0010409 | A1* | 1/2014 | Yamashita | G06V 10/752 382/103 |
| 2014/0072228 | A1* | 3/2014 | Rubinstein | G06T 7/207 382/197 |
| 2017/0024907 | A1* | 1/2017 | Bermano | G06V 40/19 |
| 2019/0206031 | A1* | 7/2019 | Kim | G06T 5/006 |

OTHER PUBLICATIONS

Goodfellow, Ian J., et al, "Generative Adversarial Nets", Jun. 10, 2014, pp. 1-9.
Knuth, Donald E., "The Art of Computer Programming", vol. 2 / Seminumerical Algorithms, Third Edition, Addison-Wesley, Nov. 4, 1997, pp. 1-11.
Oh, Tae-Hyun, et al, "Learning-based Video Motion Magnification", Aug. 1, 2018, pp. 1-26.
Welford, B.P., "Note on a Method for Calculating Corrected Sums of Squares and Products", Technometrics, vol. 4, No. 3, Aug. 1962, pp. 1-3, Published by: American Statistical Association and American Society for Quality Stable, https:www.jstor.org/stable/1266577.

* cited by examiner

*Primary Examiner* — Shahbaz Nazrul
(74) *Attorney, Agent, or Firm* — Armis IP Law, LLC

(57) ABSTRACT

A video processing system receives primary video capturing movement of a first object, the first object defined in the primary video by multiple contours of the first object. The video processing system receives selection information indicating a contour of interest associated with the first object; the contour of interest may be one of the multiple contours of the first object. Based on the selection information, the video processing system monitors the contour of interest. The video processing system analyzes variations in the monitored contour of interest over multiple frames of the primary video to produce magnified motion associated with the monitored contour of interest of the first object.

30 Claims, 13 Drawing Sheets

VIDEO ANALYSIS AND MOTION MAGNIFICATION

BACKGROUND

One crucial function of the human eye is to detect the motion of objects captured by video. Numerous approaches have been developed to magnify motion in video. Via conventional approaches, subtle motion that is imperceptible to the naked eye can be easily seen. Studying the optical characteristics/pixelwise changes of the motion magnified video can shed light on various movements that were not previously known.

One conventional technique of monitoring motion is a first learning-based approach which achieves high quality motion magnification with fewer ringing effects and better noise characteristics. Such techniques do not rely upon hand designed decomposition filters as in the case of previous approaches. The conventional motion monitoring technique includes a synthetic data generation method; the output data of it was used to train the model to learn these decomposition filters. This approach performs magnification of the entire area in the video without being selective to a particular region.

BRIEF DESCRIPTION OF EMBODIMENTS

Embodiments herein include novel video magnification techniques, enabling better use of video to detect events of interest.

More specifically, a video processing system (such as video processing hardware, video processing software, or a combination of video processing hardware and video processing software) receives primary video capturing movement (motion) of a first object; the first object is defined in the primary video by multiple contours of the first object. The video processing system receives selection information indicating a contour of interest associated with the first object. The selected contour of interest may be one of multiple contours of the first object. Based on the selection information, the video processing system monitors the contour of interest. The video processing system then analyzes variations in the monitored contour of interest over multiple frames of the primary video to produce a rendition of magnified motion associated with the monitored contour of interest of the first object.

Note that the monitored contour of interest can be represented in any suitable manner. For example, in one nonlimiting example embodiment, the monitored contour of interest is a cluster of pixels; the selection information specifies attributes of the cluster of pixels. In further example embodiments, a spatial distribution of pixels (such as the cluster of pixels) associated with the monitored contour of interest in the video varies over time. In other words, a shape or location of a contour of the contour of interest may change over time. Embodiments herein include analyzing the changes associated with the monitored contour of interest (such as spatially) over time and producing the magnified motion to reflect these changes.

In further example embodiments, the monitored contour of interest is disposed on a surface of the first object and is disposed within outermost edge contours of the first object captured by the primary video. Additionally, or alternatively, the monitored contour of interest is an edge contour of the first object captured in respective frames of the video.

As previously discussed, the video processing system as discussed herein analyzes the variations in the monitored contour of interest. For example, for a first frame of the primary video, the video processing system can be configured to detect a first rendition of the monitored contour of interest; for a second frame of the primary video, the video processing system can be configured to detect a second rendition of the monitored contour of interest. In one embodiment, the video processing system produces an auxiliary video including the magnified motion based on spatial differences between the first rendition of the monitored contour of interest in the first frame and the second rendition of the monitored contour of interest in the second frame.

The video processing system can be configured to produce the auxiliary video in any suitable manner. For example, in one embodiment, the video processing system produces settings of pixels in the auxiliary video representing the magnified motion. In one embodiment, the settings of the pixels representing the magnified motion are different than settings of corresponding pixels in the primary video representing the monitored contour of interest. The settings of the pixels (corresponding to the detected motion of the first object and respective contour) provides a visual indication of the motion associated with the monitored contour of interest and/or a magnitude of such motion of the monitored first object. In one embodiment, one or more dimensions of a rendition of the magnified motion (such as settings of pixels representative of the motion) in the auxiliary video indicates a magnitude of movement of the monitored contour of interest in one or more different spatial directions from one image frame to the next. In yet further example embodiments, the video processing system analyzes the variations in the pixels (associated with the monitored contour of interest) via implementation of density-based clustering and standard deviations of pixel settings of a first rendition of the monitored contour of interest in a first frame of the primary video with respect to a second rendition of the monitored contour of interest in a second frame of the primary video.

Further embodiments herein include, via the video processing system, and prior to receiving the selection information: i) detecting presence of the multiple contours of the first object in the primary video; and ii) presenting the multiple contours to a user for selection. The video processing system receives selection of the contour of interest associated with the first object via input from a user or other suitable entity that selects the contour of interest from the multiple contours presented to the user.

Still further example embodiments herein include, via the video processing system: receiving a first frame and a second frame of the primary video; detecting a first rendition of the contour of interest in the first frame; detecting a second rendition of the contour of interest in the second frame; and comparing the first rendition of the contour of interest to the second rendition of the contour of interest to produce magnified motion of the contour.

As discussed herein, a video processing system and related components provide the ability to be selective about pixels and corresponding contours being monitored. Such a technique provides the ability to identify the contours based on varying pixel intensity associated with clusters of pixels. The video processing system magnifies specific selected sets (clusters) of pixels corresponding an object of interest that is known to move over time. The selection of clusters can be based on user input or the pixels of interest can be selected via respective computer machine.

Yet further, embodiments herein include a bilateral video processing system that provides the ability to process the video pre and post-magnification. The pre-magnification technique includes identifying contours of one or more objects in a sample video and then magnifying motion based on variations in settings associated with pixels belonging to the one or more contours. In one embodiment, post magnification includes magnifying an entire video first and then identifying the contours; a learning unit associated with the video processing system helps improve the motion processing.

Conventional techniques include use of limited fixed-size data from COCO and PASCAL VOC datasets to train the model. In contrast to conventional techniques, embodiments herein include adversarial learning (such as GAN or Generative Adversarial Network) based approach to generate data to train the model as opposed to relying on COCO or PASCAL datasets. Accordingly, embodiments herein are significantly different than conventional techniques. This equips the video processing system with the capability to augment the dataset size that is to be used. Users can specify any amount of data to be used. Using an increased amount of data can lead to improved model performance (accuracy).

Additionally, when training the motion magnification model, embodiments herein include providing the ability to provide contour as an input. This prevents noise from being treated as a signal as well as consumes fewer processing resources/time to generate a result. Certain embodiments herein include motion magnification techniques that use such contour while training the model.

As an example over conventional techniques, further embodiments herein include calculations to illustrate how much this technique saves in the utilization of the computer resources (CPU, Memory, and Storage). Assume that the resolution of frames in video of an entity such as an infant is 544 pixels×960 pixels. The total Number of Pixels in the frame=522,240 pixels. The number of Pixels in the cluster corresponding to the contour of interest (object such as a zipper on clothing of the infant)=3280 pixels. So, according to embodiments herein, less than 1% of the total pixels is processed/magnified by the video processing system as opposed to processing motion of object/contours that are not of interest. This reduces the memory/processing/storage requirements associated with storing respective video of the one or more objects.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: receive primary video capturing movement of a first object, the first object defined in the primary video by multiple contours of the first object; receive selection information indicating a contour of interest associated with the first object, the contour of interest being one of the multiple contours of the first object; based on the selection information, monitor the contour of interest; and analyze variations in the monitored contour of interest over multiple frames of the primary video to produce magnified motion associated with the monitored contour of the first object.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
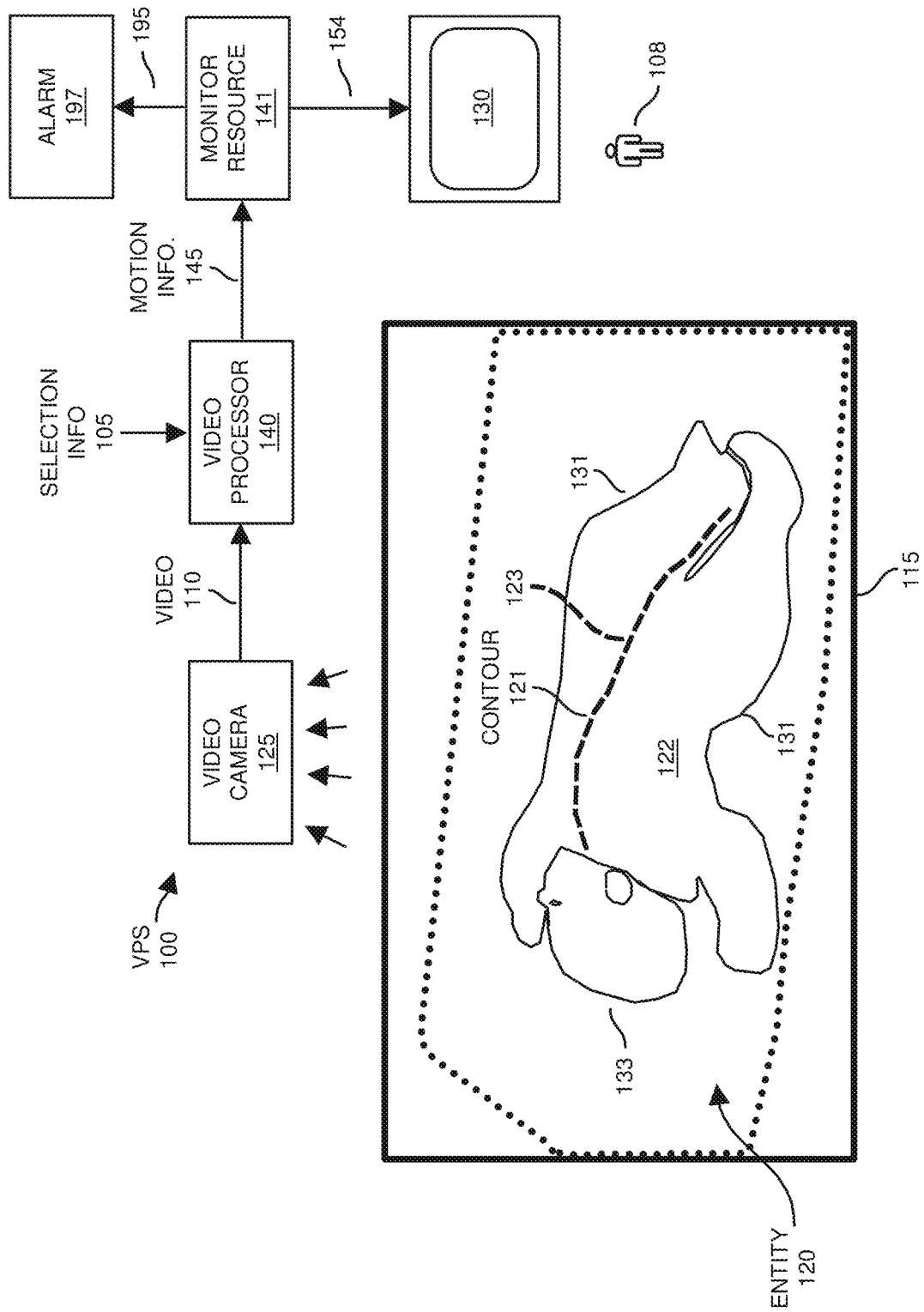
FIG. 1 is an example diagram illustrating monitoring of motion, magnification of the motion, and generation of motion information according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

Magnifying an entire video requires a lot of processing power and takes a long time. Typically, there is specific matter in video that is of interest. In such cases, magnifying those areas could be waste of resources and can magnify noise.

Via the unaided eye, one cannot specify the most accurate area where pixel intensity changes. Thus, in order to study motion magnification characteristics, identifying the optimal contour of interest is useful. Manually selecting the area of interest by drawing a bounding box around pixels of interest can often lead to a skewed situation, where the contribution of essential pixels is masked due to the less important ones. This is because the actual area of interest may be sufficiently smaller than the selected area, potentially leading to false motion results.

Obtaining real time motion magnified video pairs is difficult and hence, motion magnified simulation data needs to be created separately. Learning based approach in Ref-1 has used limited 200k images and 7K segmented objects from the COCO and PASCAL VOC dataset for background and foreground.

Embodiments herein include a video processing system such as including a bilateral/two-way methodology for motion magnification.

1.) An entire video of monitoring one or more objects may not be available for processing. Moreover, as previously discussed, available resources (such as memory, computer processor hardware, etc.) may be unavailable or limited. For these circumstances, embodiments herein include implementing Contour Specific Pre-magnification processing, where the video processing system identifies one or more areas/contours of interest first and then magnifies the motion limited only to that portion in the video (such as only a set of pixels). In such an instance, the video processing system can be configured to magnify detected motion in near real time, processing the video in chunks and in a temporally sequential manner.

2.) Alternatively, embodiments herein include a video processing system operative to implement a Post magnification processing method. For example, when processing constraints are relaxed, and an entire video is made available, the video processing system as discussed herein magnifies the motion associated with all objects in the video over time and then identifies the contours. When comparing the pre and post magnification contours, the video processing system and corresponding output provides insights into contours that are not captured by the former method.

In further example embodiments, the proposed solutions as discussed herein include implementing an intelligent learning unit. This unit learns from the post magnification processing implemented by the video processing system. The post magnification processing improves the contour identification in the pre-magnification method. In certain instances, the video processing system as discussed herein includes adversarial learning in order to provide improved (such as more accurate) motion analysis and magnification of same.

Now, more specifically, with reference to the drawings, FIG. 1 is an example diagram illustrating monitoring and motion magnification according to embodiments herein.

In this example embodiment, the video processing system 100 includes video camera 125, video processor 140, monitor resource 141, and display screen 130.

During operation, the video camera 125 monitors environment 115 such as including entity 120 (such as a one or more objects). The entity 120 can be any suitable object of interest, one or more portions of which move over time.

In one embodiment, the entity 120 is an infant wearing clothing such as a onesie. The clothing 122 includes a respective object of interest 123 such as a zipper defined by contour 121. Note that the entity 120 includes multiple contours such as contour 131 (such as an outline of the clothing worn by the entity 120). Contour 133 defines a head of the entity 120 (such as infant).

Note further that each of the components as discussed herein can be implemented as hardware, software, or combination of hardware and software. For example, the video processing system 100 can be configured as video processing hardware, executed video processing software, or a combination of video processing hardware and executed video processing software. The video processor 140 can be configured as video processor hardware, executed video processor software, or a combination of video processor hardware and executed video processor software. The monitor resource 141 can be configured as monitor hardware, executed monitor software, or a combination of monitor hardware and executed monitor software.

As further shown in this example embodiment of FIG. 1, the video processing system 100 (such as video processing hardware, video processing software, or a combination of video processing hardware and video processing software) and corresponding video camera monitors the environment 115 and produces respective primary video 110. The primary video 110 may include sequences of images of one or more moving objects (entities) present the monitored environment 115. The primary video may also capture corresponding sound associated with the entities monitored in the environment 115.

The video processor 140 receives the primary video 110 capturing movement of a first object (as well as possible sound associated with the first object). The first object (such as entity 120) is defined in the primary video 110 by multiple contours such as contour 121, contour 131, contour 133, and so on.

In one embodiment, the video processor 140 receives selection information 105 indicating a contour of interest associated with the entity 120 (a.k.a., first object). Assume that the selection information 105 indicates the contour 121 is the contour of interest amongst the multiple contours associated with entity 120.

As further discussed herein, based on the selection information 105, the video processor 140 monitors the contour of interest 121 as captured in the primary video 110. The video processor 140 then analyzes variations (such as movement) of the monitored contour of interest 121 over multiple image frames of the primary video 110 to produce motion information 145 associated with the monitored contour of interest 121 of the entity 120 (a.k.a., first object).

Note that the monitored contour of interest can be represented in any suitable manner. For example, in one nonlimiting example embodiment, the monitored contour of interest 121 is a cluster of pixels; the selection information 105 specifies attributes of the selected cluster of pixels. In further example embodiments, a spatial distribution of the cluster of pixels associated with the monitored contour of interest 121 in the video varies over time. In other words, because of movement of the object itself or angle of capturing an image of the object, a shape of contour of the contour of interest 121 may change over time based on movement of the entity 120. A model associated with the monitored entity can be used to determine which portion of the captured images represents the contour of interest as it changes shape. The model can be used to determine typical changes in a shape of contour based on an object type. As previously discussed, embodiments herein include implementing the video processor 140 to identify motion of the contour of the object as well as analyze the changes to the monitored contour of interest 121 over time and produce the magnified motion to reflect capture these changes.

In further example embodiments, the monitored contour of interest 121 is disposed on a surface of the first object (entity 120) and is disposed within one or more outermost edge contours of the entity 120 captured by the primary video 110. For example, the contour of interest 121 is a zipper of a onesie that resides within an outline of the onesie. Additionally, or alternatively, the monitored contour of interest 121 is an edge contour of the entity 120 captured in respective frames of the video.

The video processing system 100 and corresponding components as discussed herein analyzes the variations in the monitored contour of interest 121. For example, for a first frame of the primary video 110, the video processing system 100 detects a first rendition of the monitored contour of interest 121; for a second frame of the primary video 110, the video processing system 100 detects a second rendition of the monitored contour of interest 121, and so on.

In one embodiment, the video processing system 100 produces an auxiliary video 154 including the magnified motion based on a spatial difference between at least the first rendition of the monitored contour of interest 121 in the first frame of the primary video 110 and the second rendition of the monitored contour of interest 121 in the second frame of the primary video 110. The magnified motion can be a still frame of information or moving picture indicating the motion. In one embodiment, the auxiliary video 154 is a heat map indicating intensity of motion associated with the contour of interest 121.

Note that the video processing system 100 can be configured to produce the auxiliary video 154 indicating spatial motion of the monitored one or more contour of interest over time in any suitable manner.

For example, in one embodiment, the video processing system 100 produces settings of pixels in the auxiliary video 154 representing the magnified motion. In one embodiment, the settings of the pixels in the auxiliary video 154 representing or indicating the magnified motion of the contour of interest 121 are different than settings of corresponding pixels in the primary video representing the monitored contour of interest 121 associated with the object 123. The settings of the pixels in the auxiliary video (corresponding to the detected motion of the entity 120 and respective contour of interest) provide a visual indication of the motion associated with the monitored contour of interest 121 and/or a magnitude of such motion of the monitored entity 120 (such as first object).

In one embodiment, one or more dimensions of a rendition of the magnified motion (such as settings of pixels representative of the motion) in the auxiliary video 154 indicate a magnitude of movement of the monitored contour of interest in one or more different spatial directions. The magnitude of motion can be monitored (such as via management resource 141 or other suitable entity) over time to generate an alarm 197 (such as audible, symbol-based, etc.) in the event that the amount of motion is above or below a threshold value and a respective party needs to be notified to address the issue.

For example, if the entity 120 is a baby and the auxiliary video 154 indicates that a magnitude of motion associated with the contour of interest 121 is below a threshold value, this may indicate that the baby is no longer breathing. In such an instance, the video processing system 100 or other suitable entity generates a respective alarm signal 195 indicating the undesirable condition.

Alternatively, the one or more contours of interest monitored by the video processing system 100 may be or include one or more mechanical components such as a belt, pulley, spring, motor, etc., of a mechanical system monitored by the video processing system 100. If motion associated with the mechanical components is greater than expected threshold value, the video processing system 100 can be configured to generate a respective alarm indicating the possible failure condition via activation of alarm 197. If motion associated with the mechanical components is less than an expected threshold value, the video processing system 100 can be configured to generate a respective alarm indicating the possible failure condition via activation of alarm 197.

In yet further example embodiments, the video processing system 100 analyzes the variations in the pixels (associated with the monitored contour of interest 121) via implementation of density-based clustering analysis including application of standard deviations of pixel settings of a first rendition of the monitored contour of interest in a first frame of the primary video with respect to a second rendition of the monitored contour of interest in a second frame of the primary video. Such an analysis provides an indication of a degree to which the contour of interest 121 spatially moves over time.

Further embodiments herein include, via the video processing system 100, and prior to receiving the selection information 105: i) detecting presence of the multiple contours of the entity (such as first object) in the primary video 110 (such as first few images of the entity 120); and ii) presenting the multiple contours associated with the entity to a user 108 for review and selection. Based on user input, the video processing system 100 receives selection of the contour of interest 121 associated with the entity 120 via input from a user 108 or other suitable entity that selects the contour of interest 121 from the multiple contours associated with the entity 120 presented to the user.

Embodiments herein include selecting and filtering regions (such as one or more user selected regions or contours of a monitored object) in which to monitor and then create a motion map (such as envelope or heat map) based on the detected motion in those selected regions only as opposed to monitoring motion of every moving object in a region captured by a camera. This is useful when applied to a system and monitoring of a corresponding object or system in real-time to determine whether to generate an alarm condition.

More specifically, in a mechanical setting, note that the user 108 can select parts of a manufacturing system (such as entity 120 and corresponding one or more contours) of interest based upon prior determination of which mechanical components in the system are subject to motion and damage, potentially causing a catastrophic failure of the system. The image processing system (video processing system 100) monitors those selected regions for motion and potentially determine when the monitored motion is above or below a threshold value and then trigger a respective alarm if there was a possible failure detected based upon motion or lack of motion for a particular one or more contour of interest.

Figure 2:
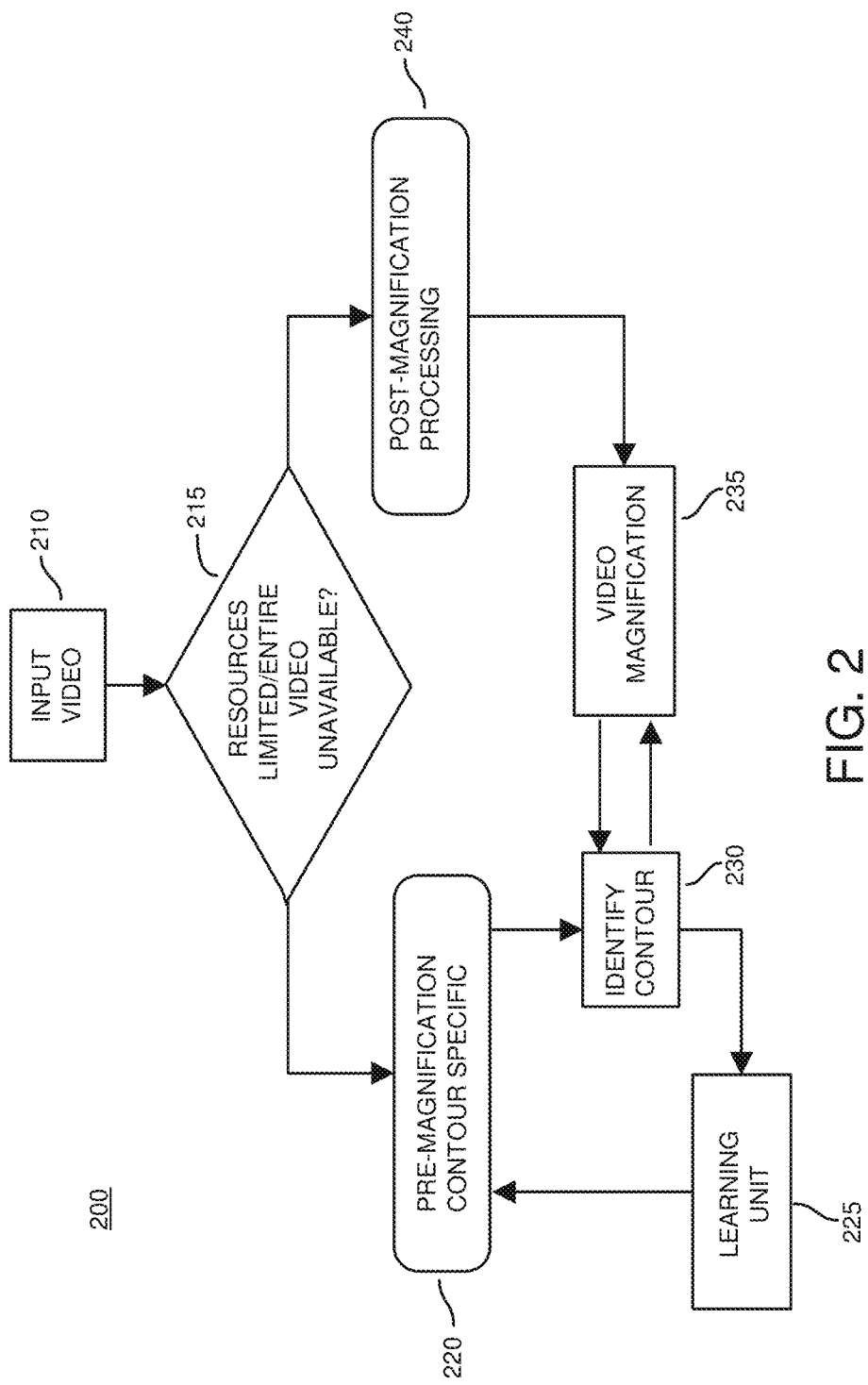
FIG. 2 is an example flowchart diagram illustrating implementation of motion magnification according to embodiments herein.

FIG. 2 is an example flowchart diagram illustrating implementation of motion magnification according to embodiments herein.

In processing operation 210 of flowchart 200, the video processing system 100 receives primary video 110.

In processing operation 215, the video processing system 100 determines if there are limited resources to process the respective primary video 110. If so (such as when resources are limited), processing flow continues at processing operation 220.

Alternatively, if resources for processing primary video 110 are not limited, or if a full analysis of motion in environment 115 is desired over a time range, processing continues at processing operation 240.

In processing operation 220, the video processing system 100 implements pre-magnification of selected one or more contours of interest. For example, in processing operation 230, the video processing system 100 identifies the different contours in a respective environment 115 being monitored. The one or more contours can be identified based on differences in settings (such as one or more of color settings, dark/light intensity settings, etc.) associated with a first set of pixels and a second set of pixels defining different objects in environment 115. Models can be used to identify different types of objects or contours of interest.

In processing operation 225, the video processing system 100 implements a respective learning unit to determine the one or more contours of interest. As previously discussed, the contours in the environment 115 can be determined based on settings of different clusters of pixels (i.e., image elements). A first set of pixels of a first color and/or intensity typically represent a first object in the primary video 110; a second set of pixels of a second color and/or intensity typically represent a second object in the primary video 110; a third set of pixels of a third color and/or intensity typically represent a third object in the primary video 110; and so on. The junction (such as where outer edges of the different sets of pixels touch each) between each of the sets of pixels represents a contour. Each of these contours may move over time as the one or more objects (such as represented by the different sets of pixels) spatially move with respect to a grid of pixels associated with the primary video 110.

As further shown, after determining an appropriate one or more contours of interest associated with a monitored environment, in processing operation 235, the video processing system 100 implements video magnification of the one or more monitored contours of interest.

In one embodiment, the one or more contours of interest are specified by the selection information 105. The selection information 105 can be generated in any suitable manner and presented to a user 108 such as on display screen 130. For example, the video processor 140 can be configured to display selectable contours of interest associated with the environment 115 on display screen 130. A user 108 or other suitable entity selects one or more contours of interest from contours displayed on the display screen 130 for inclusion in the selection information 105.

As previously discussed, the video processing system 100 receives further primary video 110 of the environment 115 and implements the selection information 105 as a way of filtering out which of the multiple contours to monitor and provide motion magnification for further display on display screen 130 or other suitable entity.

As an alternative to implementing the pre-magnification and monitoring of selected one or more contours of interest, in processing operation 240, the video processing system 100 can be configured to implement so-called post magnification processing. This includes monitoring motion associated with all of the different objects/contours that move within the monitored environment 115 as captured by the primary video 110. In processing operation 235, the video processing system 100 implements video magnification of each of the different objects/contours that move within the monitored environment 115. Note that this latter embodiment of processing all of the video and all of the corresponding moving objects is resource intensive (pixel processing, pixel storage, etc.) since many pixels in the monitored environment 115 must be monitored and compared over time to detect motion and implement magnification of same.

Accordingly, as indicated by the flowchart 200, embodiments herein include a bilateral video processing system that provides the ability to process the video pre-magnification and post-magnification. The pre-magnification technique may include identifying contours of one or more objects in a sample video and then magnifying motion based on variations in settings associated with pixels belonging to the contour. In one embodiment, post magnification includes magnifying an entire video first and then identifying the contours; a learning unit associated with the video processing system helps improve the processing.

Figure 3:
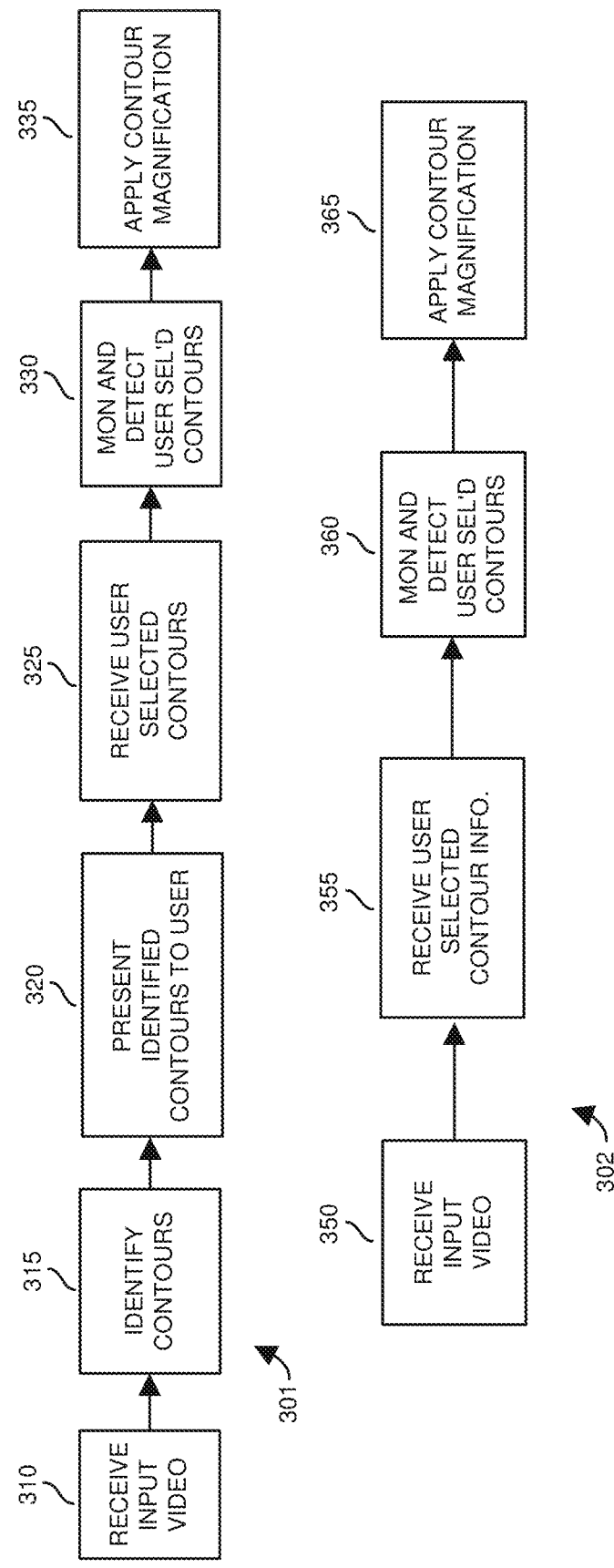
FIG. 3 is an example diagram illustrating implementation of multiple different flow controls according to embodiments herein.

FIG. 3 is an example diagram illustrating implementation of multiple different flow controls according to embodiments herein.

As shown in flowchart 301, in processing operation 310, the video processor 140 receives primary video 110 from the video camera 125 or other suitable entity. As previously discussed, the primary video 110 captures images (such as one or more frames) of one or more objects (and corresponding one or more contours of interest) present in the monitored environment 115.

In processing operation 315, the video processor 140 performs one or more operations to determine the different contours (such as edges of respective objects) present in the monitored environment 115.

In processing operation 320, the video processor 140 or other suitable entity presents the detected contours associated with the objects in the environment 115 on display screen 130 to a respective user 108.

In processing operation 325, the video processor 140 receives user selected contours of interest (associated with respective monitored objects) in the environment 115 via selection information 105.

In processing operation 330, the video processor 140 monitors and detects presence of the user selected contours in the subsequently received primary video 110 capturing motion of those objects in contours of interest in the environment 115. The contour of interest can be selected in any suitable manner. In one embodiment, the user clicks on a contour of interest displayed on the display screen 130. Additionally, or alternatively, the user 108 can select a contour of interest via text describing attributes of the contour of interest. The video processing system 100 can be configured to include a model associated with the description of the contours of interest to be monitored.

In processing operation 335, the video processor 140 applies motion magnification to the monitored one or more contours of interest as specified by the selection information 105 and displays a rendition of the magnified motion to the user 108 on display screen 130 via auxiliary video 154.

Further embodiments herein include flowchart 302 implementing contour specific pre-magnification processing as discussed herein.

For example, in processing operation 350, the video processor 140 receives the primary video 110 generated by the video camera 125.

In processing operation 355, the video processor 140 receives user selected contour information associated with the primary video 110 as specified by the selection information 105.

In processing operation 360, the video processor 140 monitors and detects motion associated with the one or more user selected contours as specified by the selection information 105.

In processing operation 365, the video processor 140 applies motion magnification to the monitored one or more contours of interest as specified by the selection information 105 and displays a rendition of the magnified motion to the user 108 on display screen 130.

Thus, embodiments herein include a video processing system 100 and related components that provide the ability to be selective about pixels and corresponding contours being monitored. Such a technique provides the ability to identify the contours based on varying pixel intensity associated with clusters of pixels. The video processing system magnifies specific selected sets of pixels (contour of interest). The selection of clusters can be based on user input or the pixels of interest can be selected via respective computer machine.

Figure 4:
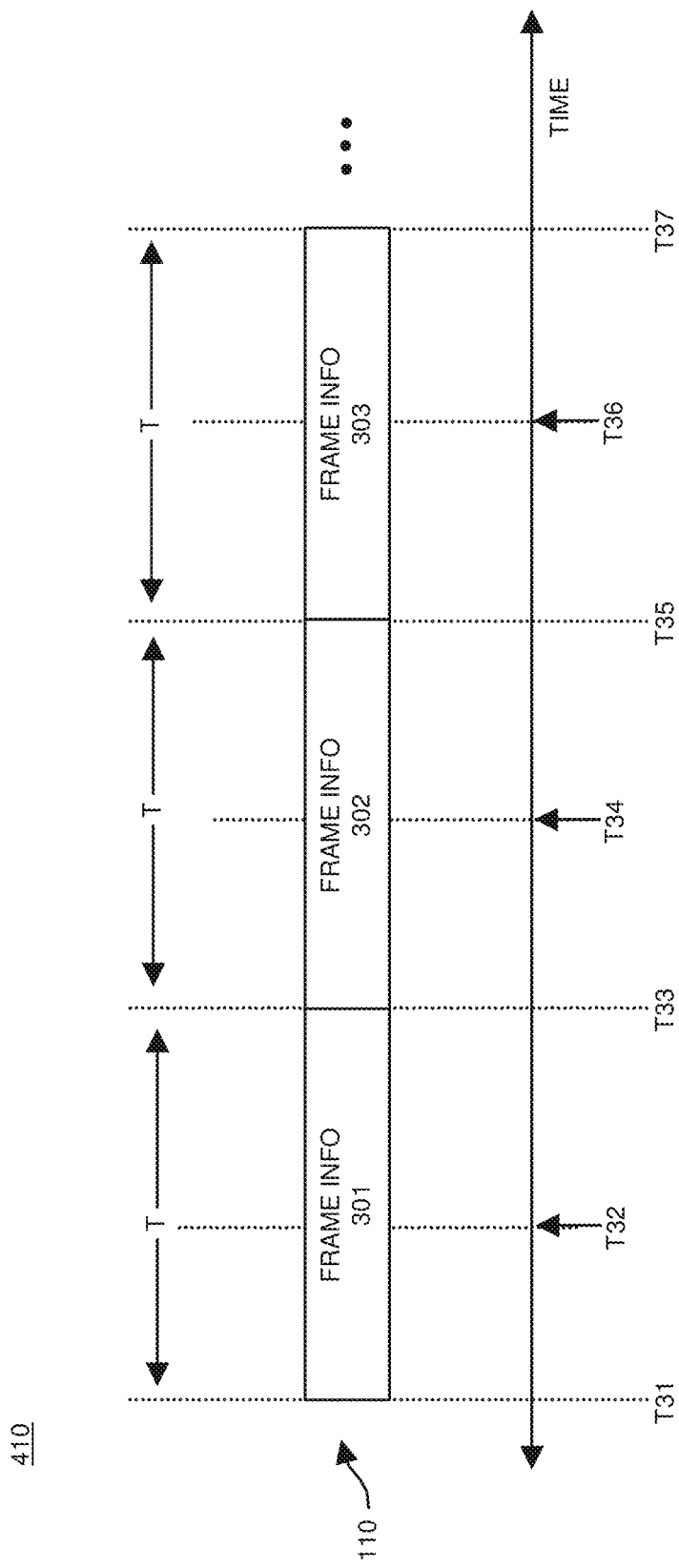
FIG. 4 is an example timing diagram illustrating processing of video content in real-time or quasi-real-time according to embodiments herein.

FIG. 4 is an example timing diagram illustrating processing of video content in real-time or quasi-real-time according to embodiments herein.

As further discussed herein, the video processing system 100 receives primary video 110 including frame information 301 (such as multiple images of environment 115), frame information 302 (such as multiple images of environment 115), frame information 303 (such as multiple images of environment 115), etc.

At or around time T33, the video processing system 100 analyzes the frame information 301 generated by the video camera 125 between time T31 and time T33. At or around time T34, the video processing system 100 generates the auxiliary video 154 displayed on the display screen 130. The auxiliary video 154 indicates the detected motion associated with the contour of interest 121 and/or any other contours monitored in the environment 115.

At or around time T35, the video processing system 100 analyzes the frame information 302 generated by the video camera 125 between time T33 and time T35. At or around time T36, the video processing system 100 generates the auxiliary video 154 displayed on the display screen 130. The auxiliary video 154 indicates the detected motion associated with the contour of interest 121 and/or any other contours monitored in the environment 115.

Figure 5:
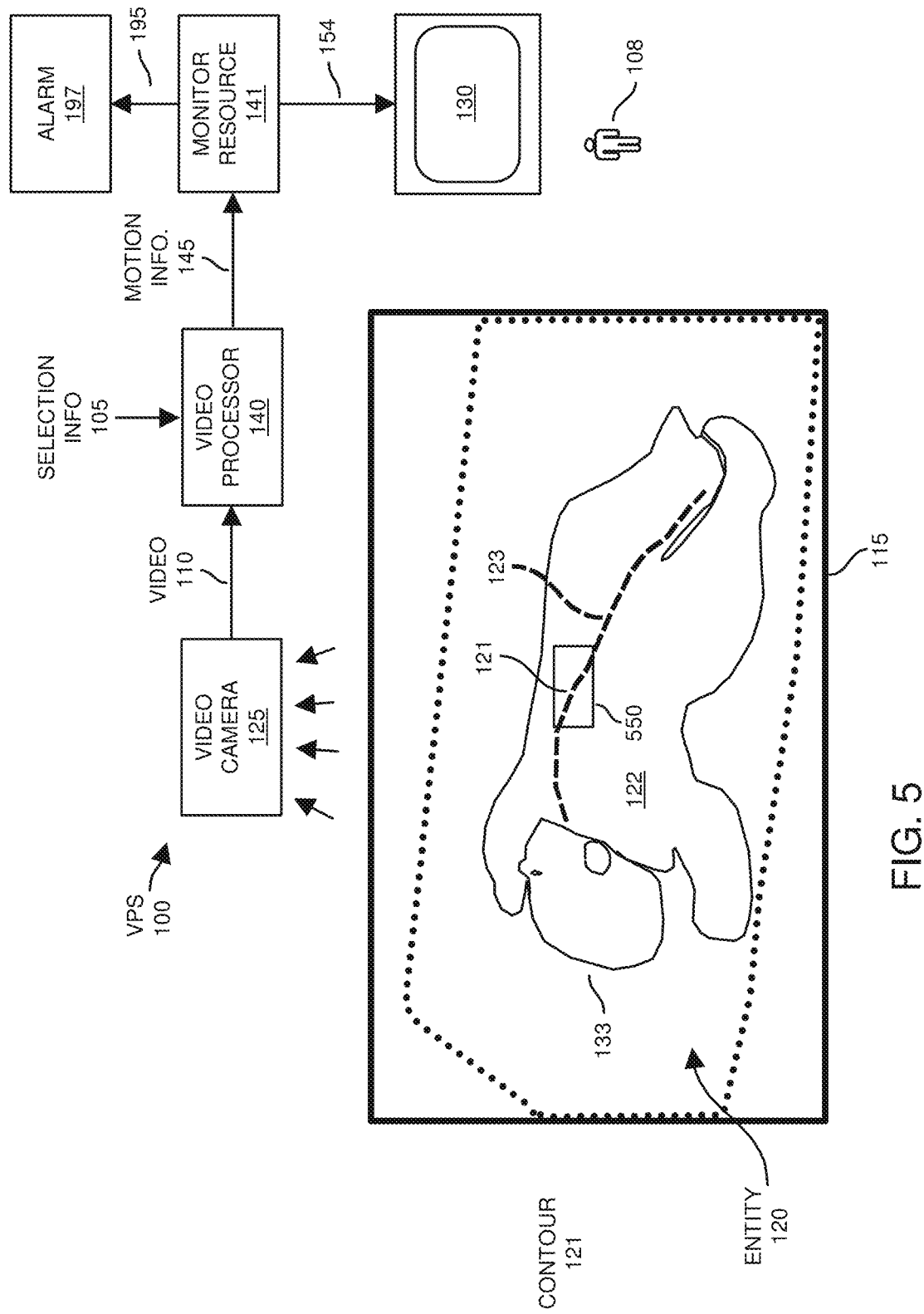
FIG. 5 is an example diagram illustrating selection of a region of interest or contour of interest and monitoring same over time according to embodiments herein.

FIG. 5 is an example diagram illustrating selection of a region of interest or contour of interest and monitoring according to embodiments herein.

In this example embodiment, the video processor 140 receives input from the user 108 or other suitable entity that a portion of the object (entity 120) of interest such as zipper in the region of interest 550 is a desired contour of interest 121. Even though the contour associated with the object 123 extends from the head of the infant to the left foot of the infant, the contour of interest 121 monitored by the can be limited to a portion of the entire contour associated with the object 123. For example, the region of interest 550 specifies a portion of the object 123 and corresponding contour of interest to be monitored by the video processing system 100.

As previously discussed, the video processor 140 detects a respective one or more contour of interest associated with a selected object (such as a first color) based on differences between sets of pixels representing the zipper versus pixels representing cloth material (surrounding the zipper) of a second color.

Figure 6:
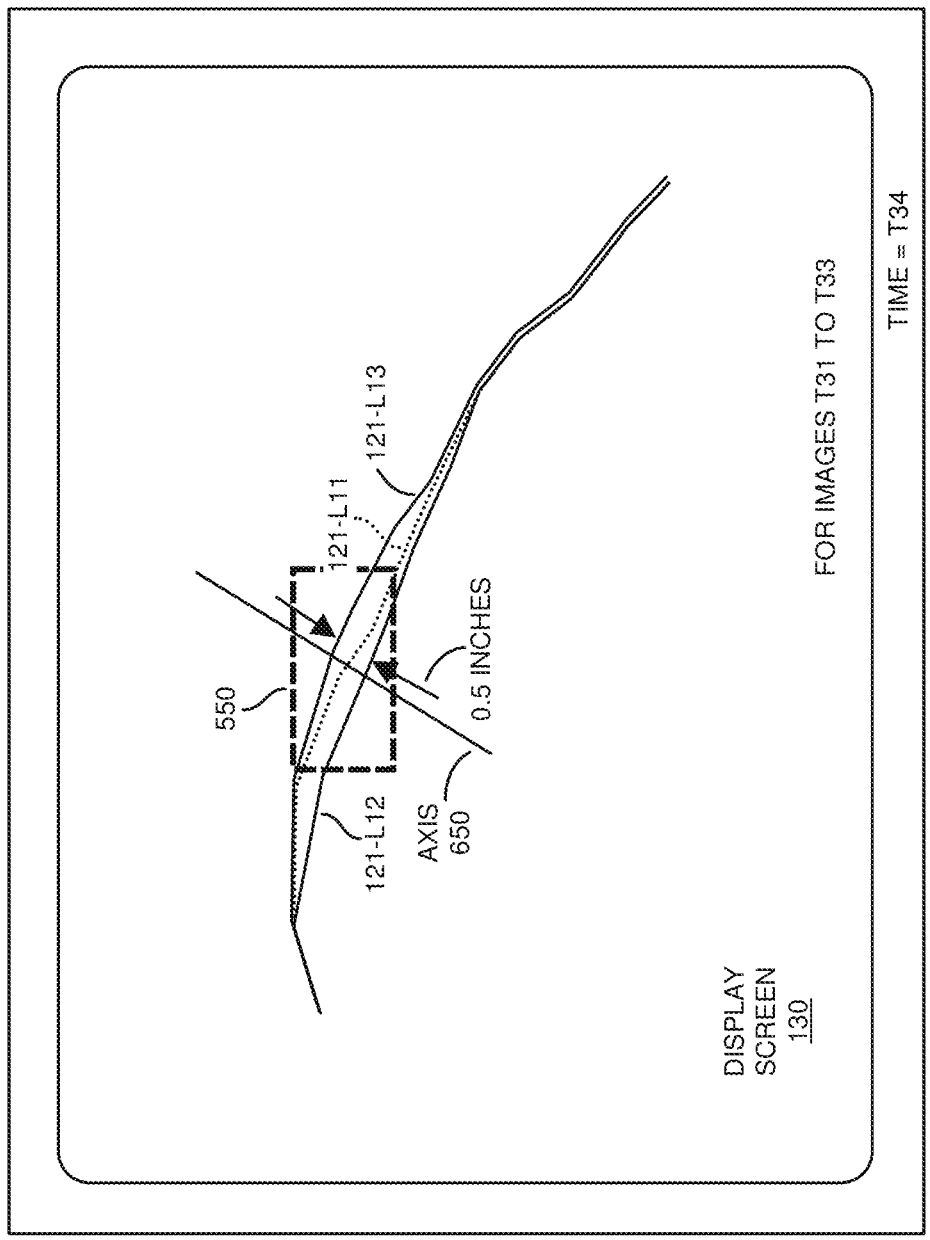
FIG. 6 is an example diagram illustrating a close up of a monitored contour of interest and measurement of magnified motion according to embodiments herein.

FIG. 6 is an example diagram illustrating a close up of a monitored contour of interest and measurement of magnified motion according to embodiments herein.

In this example embodiment, the video processor 140 keeps track of a magnitude of the corresponding motion associated with the selected contour of interest 121 residing within the region of interest 550 (such as a window of multiple pixels).

Note that the monitored contour of interest 121 (such as zipper, pulley, belt, etc.) can be configured to move in accordance with a cyclical motion. For example, the entity 120 may breath in and breath out over time.

In one embodiment, the video camera 125 is stationary. The breathing of the entity 120 causes the object or contour of interest 121 to spatially move within the monitored environment 115 and be captured by different corresponding grid of pixels of an image captured by the video camera 125.

For example, based on one or more first images captured by the video camera 125, video processor 140 detects that the contour of interest 121 as indicated by the selection information 105 resides at a first location 121-L11 at a first instant of time;

based on one or more second images captured by the video camera 125, video processor 140 detects that the contour of interest 121 as indicated by the selection information 105 resides at a second location 121-L12 at a second instant of time; based on one or more third images captured by the video camera 125, video processor 140 detects that the contour of interest 121 as indicated by the selection information 105 resides at a third location 121-L13 at a third instant of time; and so on. Thus, the contour of interest 121 is found at different locations of respective images captured by the video processing system 100.

As previously discussed, motion associated with the contour of interest may be cyclical. For example, the contour of interest 121 moves to location 121-L12 at a full inhale condition of entity 120; the contour of interest 121 moves to location 121-L13 at a full exhale condition of entity 120. The video processor 140 selects a sample time of controlling image collection of the environment 115 based on the cyclical period of the entity 120 inhaling and exhaling. The video processor 140 controls the video camera to obtain images of the entity at a substantially higher rate than a frequency of motion associated with the contour of interest 121. For example, if the cycle of inhale/exhale is one second in duration, the video processor 140 sets the frequency of capturing images of the entity at a frequency of 5 or more times per second.

In further example embodiments, the video processor 140 generates motion information 145 indicating a spatial variation of the contour of interest for a first range of time (such as one or more cycles of motion associated with the contour of interest 121). For example, for images captured between time T31 and T33, the video processor 140 detects a variation of 0.5 inches in the motion of the contour of interest 121 along axis 650. In one embodiment, the video processor 140 indicates the detected motion of the contour of interest (or object of interest) via a heatmap (such as rendition of the motion information 145-1) to indicate the amount of motion for the monitored time range T31 to T33 (such as one or more cycles of motion associated with the contour of interest 121) by highlighting a region of pixels disposed in between location contour of interest at location 121-L12 and contour of interest at 121 at location 121-L13.

In one embodiment, the region of pixels representing magnified motion is displayed as a different color than a color of the object 123 (such as zipper) or the color of the clothing 122. See also FIG. 8. The dark/light intensity of the motion magnification and corresponding pixels in between contour of interest at location 121-L12 and contour of interest at location 121-L13 varies depending on an amount of detected motion associated with the contour of interest 121. For example, in the heat map of FIG. 8, a very light intensity of pixels indicating motion between contour of interest at location 121-L12 and contour of interest at location 121-L13 (envelope region representing a change shape of the contour of interest such as a reference object or zipper associated with the object and/or object itself over time) indicates a high degree of motion associated with the contour of interest; a very dark intensity of pixels indicating motion in the envelope region outside if contour of interest location 121-L12 and contour of interest location 121-L13 indicates a low or no degree of motion.

Figure 7:
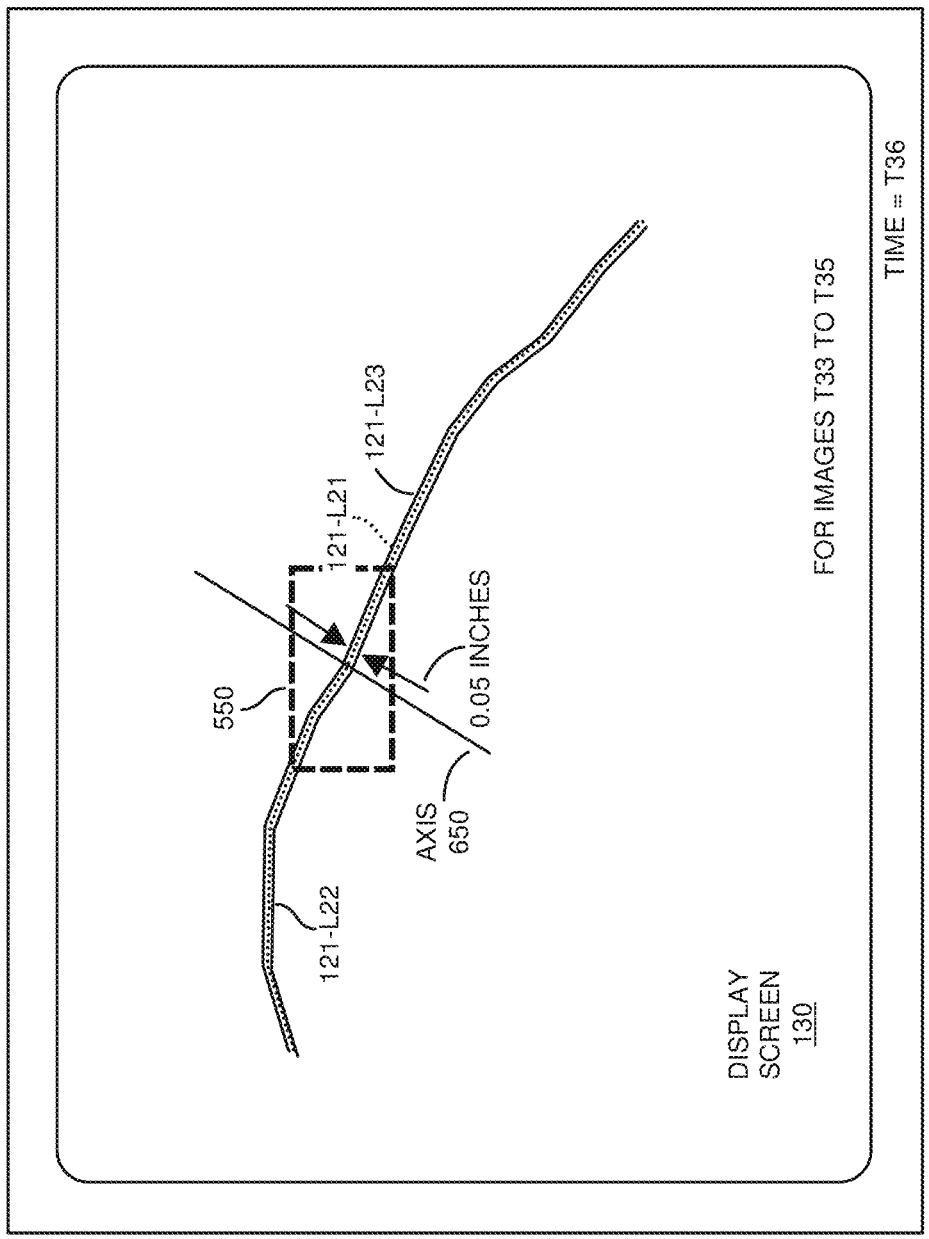
FIG. 7 is an example diagram illustrating a close up of a monitored contour of interest and measurement of magnified motion according to embodiments herein.

FIG. 7 is an example diagram illustrating a close up of a monitored contour of interest and measurement of magnified motion according to embodiments herein.

In further example embodiments, as shown in FIG. 7, the video processor 140 generates motion information 145 indicating a spatial variation (envelope of movement) of the contour of interest for a second range of time. For example, for images captured between time T33 and T35, the video processor 140 detects a variation of 0.05 inches (very little motion compared to detected motion in FIG. 6) in the motion of the contour of interest 121 along axis 650. In one embodiment, the video processor 140 indicates the detected motion of the contour of interest (or object of interest) via a heatmap (such as rendition of the motion information 145-2) to indicate the amount of motion for the monitored time range T33 to T35 by highlighting a region of pixels disposed in between contour of interest at location 121-L22 and contour of interest at 121 at location 121-L23.

Lack of motion as indicated by the rendition of magnified motion on display screen 130 may raise concerns about the entity 120.

Additional Description of the Contour Specific Pre-Magnification Processing

This approach provides the ability to magnify the motion in the primary video 110 in near real time. For example, as previously discussed, the video processor 140 first identifies the clustered pixels of interest (i.e., pixels associated with contour of interest) and then magnifies corresponding motion in that region using a magnification approach as follows:

1. Estimate the following parameters.

With reference to FIG. 4, assume that it takes M seconds to process and output the resulting primary video 110, as well as obtain the video of length N frames. In one embodiment, frame information 301 includes a first set of N image frames, frame information 302 includes a second set of N image frames, frame information 303 includes a third set of N image frames, and so on. Each set of N image frames represents a corresponding duration of T seconds of captured video.

Between time T33 and time T34, the video processor 140 processes the video frame information 301 (of primary video 110) captured by video camera 125 between time T31 and T33 to detect and magnify motion; between time T35 and time T36, the video processor 140 processes the video frame information 302 (of primary video 110) captured by video camera 125 between time T33 and T35 to detect and magnify motion; and so on Note that the RGB (Red-Green-Blue) pixel intensity parameters or settings associated with each of the pixels in the sequence of images may vary over the period of interest.

2. For a selected one or more contours of interest, the video processor 140 performs temporal statistical analysis of the primary video 110 by computing the spatial pixel intensity variance and standard deviation over the duration T seconds (also discussed in detail in Proposition 1 below) for a respective set of image frames and corresponding contour of interest 121.

3. The video processor 140 identifies and generates a heatmap contour plot (such as in FIG. 8) of the standard deviation calculated in the above step which describes where pixel intensity varies the most for the monitored contour of interest 121. (e.g., see Proposition 1 for more details).

4. In one embodiment, the video processor 140 clusters the pixels (associated with the contour of interest) using density based spatial clustering (discussed in Proposition 2); the user 108 picks the region (cluster) of interest and discards (for example, does not process) the rest of the pixels that are not of interest. For instance, in FIG. 6, a hospital might be interested in the vital signs of the baby (entity 120), whereas a furniture manufacturer maybe interested in a different object in the monitored environment 115 such as a crib as captured by the images.

5. The video processor magnifies the motion only for the user selected region using the pre-trained motion magnification model discussed in Proposition 3.

Some areas may not appear in the heat map plots of the unmagnified video sequence but are important, so embodiments herein can include post magnification processing.

Processing Proposition 1: Contour of Interest

This contour highlights the area where a pixel setting value shift takes place.

In order to extract and identify a contour of interest, the video processor as discussed herein determines the variance and, in turn, the standard deviation of the pixel intensity of each of the one or more pixels in the contour of interest 121 over the period of interest. The variance calculations are as accurate as possible to minimize the impact of the accumulation of the error. Since there can be millions of pixels to process and memory may be limited, in one embodiment, the video processor carefully selects a single pass online algorithm. Taking all these factors into consideration, the video processor implements a Knuth implementation, a Welford algorithm, or other suitable one or more algorithms to calculate the variance and standard deviation.

Figure 8:
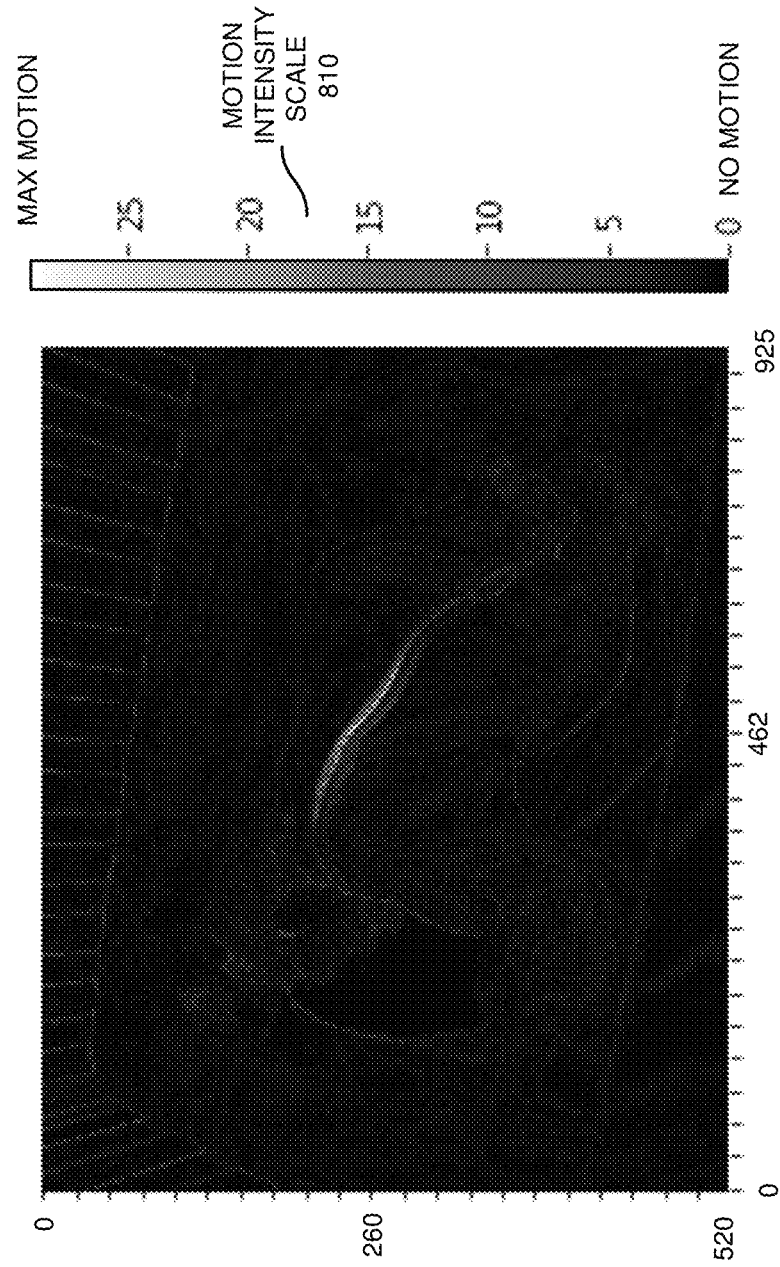
FIG. 8 is an example diagram illustrating a heat map of detected motion according to embodiments herein.

Using the standard deviation data, the video processor generates the heat map as shown in FIG. 8, which highlights the pixels in the entire image where standard deviation varies the most (see the envelope of detected motion as previously discussed).

This contour provides information of the pixels where the motion occurs, and only those pixels are used for further analysis.

Video Processing Proposition 2: Cluster of Pixels

Once the contour of interest is determined and detected, the video processor equips the user with the flexibility to choose, accept or reject any of the detected the contours for further analysis. As previously discussed, the contours presented to the user 108 may include any detected contour or only contours detected as moving in a grid of pixels over time of viewing multiple images.

The video processor system obtains the mappings of the spatial location and the associated standard deviation of each pixel in the image. Contours or detected envelopes of magnified motion obtained from the heat map in FIG. 8 can be in arbitrary shapes and there can be outlier points in the data.

Therefore, the video processing system 100 performs density-based clustering weighted by the standard deviation of the pixel values.

For example, in FIG. 8 may indicate some pixel variance activity (movement associated with the contour of interest 121 and corresponding envelope where the contour of interest resides over a window of time) near the chest (contour of interest 121) as well as edges of a crib. If the user 108 is interested only in baby's breathing pattern, via the aid of clustering, the video processor system 100 and user 108 can ignore the contours of the crib.

FIG. 8 is an example diagram illustrating post magnification of motion and corresponding contours according to embodiments herein.

In this example embodiment, the display screen 130 displays the detected envelope of motion associated with the monitored contour of interest 121 and displays it with pixels set to a maximum motion setting to indicate motion of the contour of interest 121. Darker regions of the image in FIG. 8 outside the detected envelope of motion indicate little or no motion.

As previously discussed, display of the auxiliary video 154 on display screen 130 can include displaying a static image of the detected envelopes of motion of monitored contour of interest 121 or the auxiliary video 154 can be a video of changing images indicating the variations in detected envelopes of motion associated with the contour of interest 121 for each of multiple monitored ranges of time. Thus, in one embodiment, the display of the auxiliary video 154 on display screen 130 includes a moving window of time of displaying respective different degrees of motion associated with the monitored contour of interest 121 and corresponding detected envelope of motion.

Post-Magnification Processing

In one embodiment, when the video processing system 100 receives the full duration of the primary video 110, (such as video of z seconds), the video processing system 100 first magnifies the entire video and then identifies any regions of interest. When comparing the results with the video result obtained from pre magnification, our research revealed some areas may be missed in the video prior to magnification.

The process follows the following flow:

1. Obtain the video of the desired duration and the RGB pixel intensity parameter of each image frame
2. Magnify the motion for the entire video using the Motion Magnification Model discussed in Proposition 3
3. Perform temporal statistical analysis by computing the spatial pixel intensity variance and standard deviation over the duration T (Proposition 1).
4. Identify and generate a plot of the standard deviation calculated in the above step that describes where pixel intensity varies the most per Proposition 1.
5. Produce a cluster the pixels using density based spatial clustering as described in Proposition 2.
6. In one embodiment, these regions are fed into a self-supervised learning neural network that helps the system to learn over time. This network learns the differences between post and preprocessing videos and helps pre-magnification network intelligently improve over time.

If the video processing system 100 is employed to monitor a baby and in all the previous instances, it focused on the breathing pattern of the baby as preferred contour of interest, the video processor system will recommend the cluster of vitals as shown in FIG. 8 as the areas of interest to the user in future events. In other words, the video processing system can be configured to generate a model indicating a region of interest and use that model in the future as a basis to monitor and magnify motion associated with the monitored one or more objects in the environment 115. As previously discussed, the video processing system 100 can be configured to alert the user 108 via sounding of alarm 197 if the baby (monitored physical entity 120) turns its side in sleep and/or if contour of interest disappears from being present in primary video 110.

Figure 10:
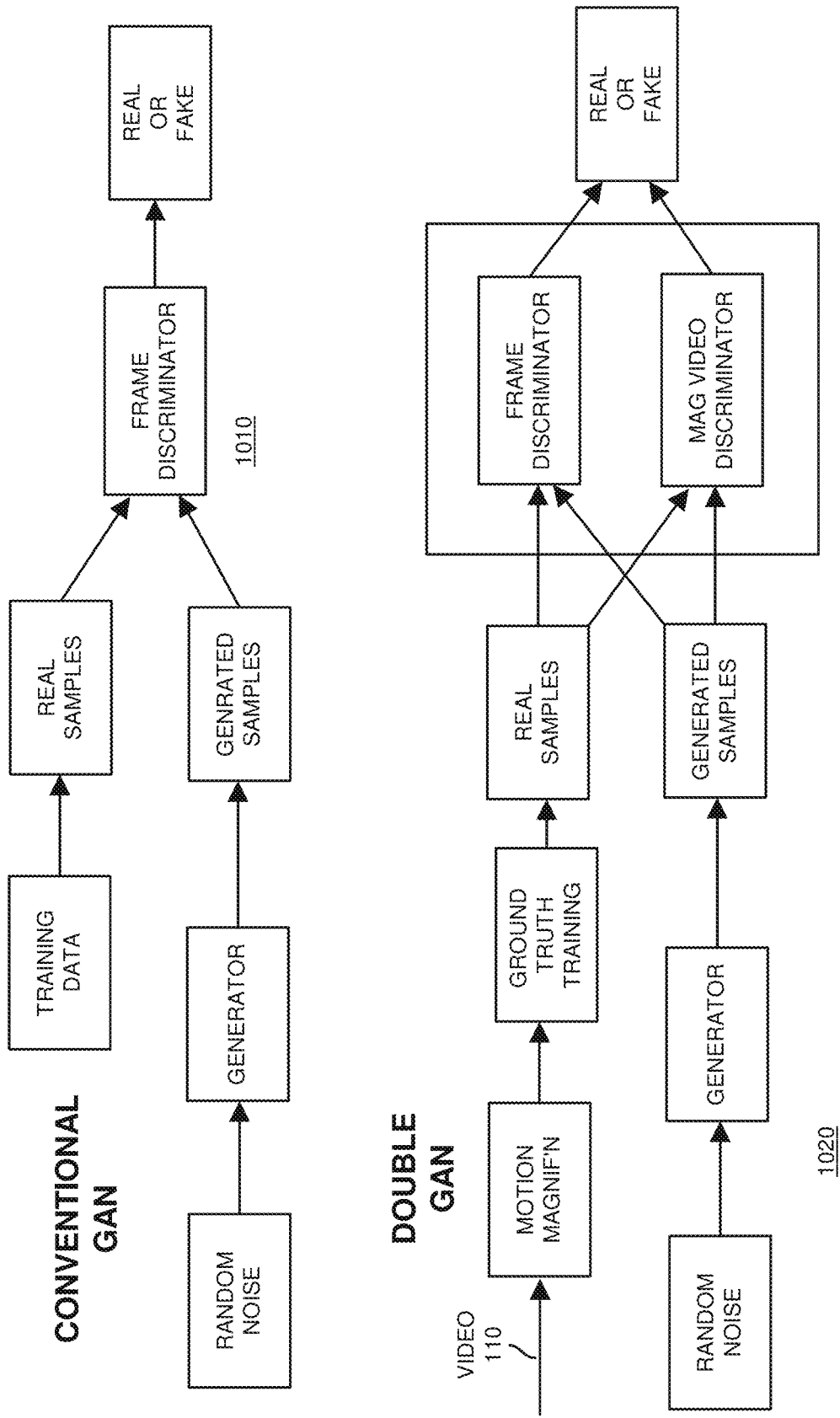
FIG. 10 is an example diagram illustrating implementation of a conventional GAN versus a double GAN according to embodiments herein.

FIG. 10 is an example diagram illustrating implementation of a conventional GAN versus a double GAN according to embodiments herein.

Figure 9:
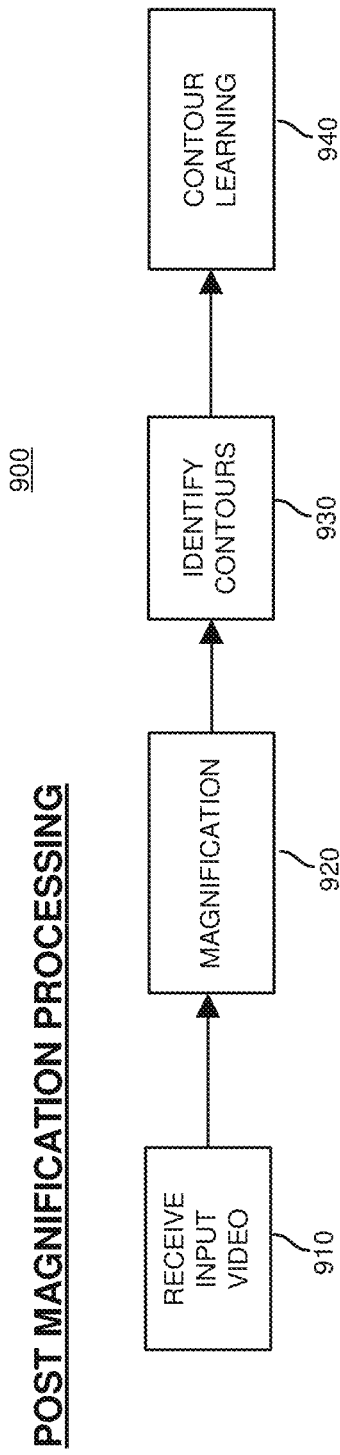
FIG. 9 is an example diagram illustrating post magnification of motion and corresponding monitoring of contours according to embodiments herein.

As shown, the double GAN 920 in FIG. 9 provides unique processing with respect to the conventional GAN 910.

Figure 11:
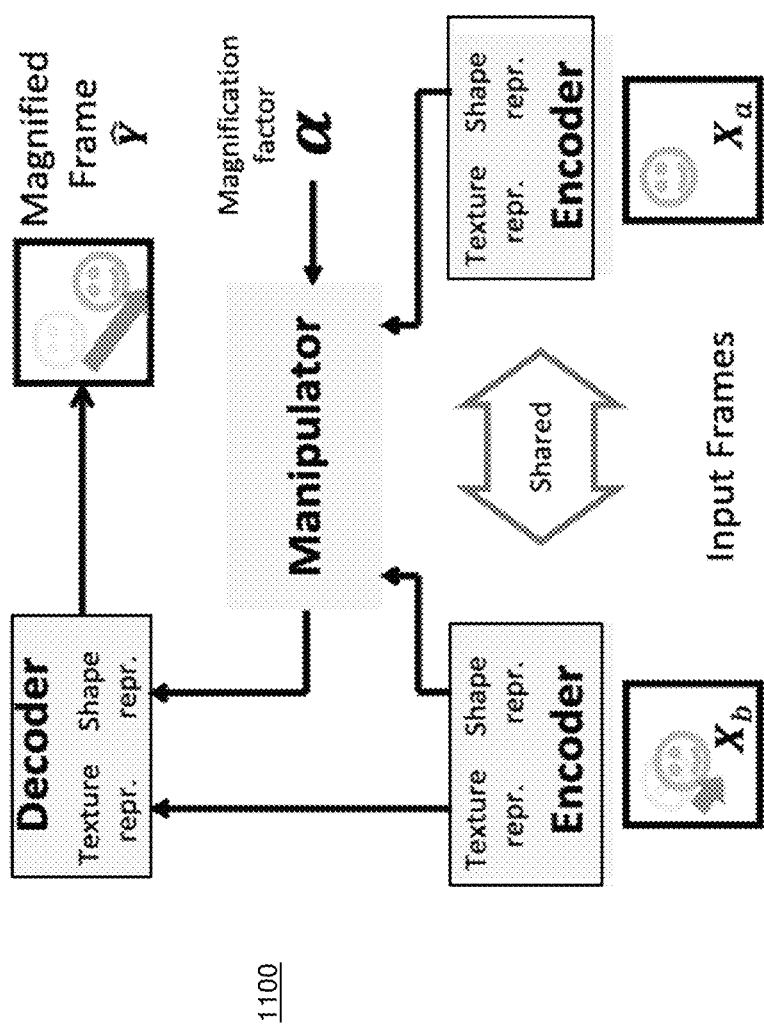
FIG. 11 is an example diagram illustrating a video monitor and analyzer system according to embodiments herein.

FIG. 11 is an example diagram illustrating a video monitor and analyzer system according to embodiments herein.

Proposition 3: Motion Magnification Model

For motion magnification, similar to the dynamic mode, the video processor system as discussed herein can be configured to implement an encoder/decoder architecture 1000 as shown in FIG. 10 using convolutional neural network in two frame setting. The video processing system 100 synthesizes texture, shape, and structure of the video including the modifications below:

a) Synthetic Data Generation Using GAN Based Architecture

Embodiments herein include developing a pretrained model to magnify the detected motion. In one embodiment, this a pretrained model that learns decomposition filters for motion magnification. In order to train this model, media data in the form of motion magnified pairs is needed.

Instead of limiting to training data to PASCAL VOC and COCO, embodiments herein include generating synthetic data using adversarial learning technique. Since the generated data is a form of video, the video processing system 100 implements the dual discriminator—for example, one discriminator path critiques each frame and the other discriminator path critiques magnification related parameters along with temporal sequence of the frames, i.e., magnified video as a whole.

Embodiments herein include generating ground truth magnified videos to be used by the discriminator needed for adversarial learning. The generator output is compared against these videos. In case needed, the user can discard some of these video pairs that do not magnify the region we're interested in or has poor results. This ensures higher quality data. Generator continues to learn until sufficient performance is achieved.

b) User Configurable Number of Images

Instead of depending on the fixed number images from PASCAL VOC and other datasets, one embodiment herein makes this selection user configurable. For example, a user can specify the number of images (N) to be used and once the video processing system 100 has that number, the associated data is generated using adversarial learning.

c) Complex Neural Nets to Learn Foreground and Background

The video processing system 100 implements deep convolutional neural networks to learn to recognize between foreground and background.

d) Contour Attention Learning

While training the model, the video processing system 100 provisions to input the contour of interest to facilitate focused learning. This allows the network to focus on specific regions. The video processing system 100 modifies the loss function in the optimization loop to accommodate the contour. This way, different weights are learned to the pixel based on spatial properties, leading to more realistic output.

The video processing system 100 provides this as a user selectable binary flag parameter. Only if set to true, the model receives contours while learning.

Impact of Implementing Video Analysis Via Video Processing System:

Embodiments herein include providing an indication of motion via a spatial contour heat map such as associated with the auxiliary video 154. The spatial contour heat map indicates locations of the pixel clusters where motion occurs as well as indicates the corresponding intensity of the motion. In one embodiment, the video processing system 100 and corresponding components as described herein implement mathematically and computationally efficient algorithms to generate a respective heat map of motion.

Embodiments herein include two-way processing, providing flexibility to fine tune motion magnification and monitoring.

Embodiments herein provide the flexibility to magnify only a cluster of video pixels (such as contour of interest or region of interest) associated with a monitored object or multiple objects.

Embodiments herein provide the ability to magnify the video in a much fast manner than conventional techniques without degrading accuracy even when the available resources to provide motion magnification and the monitoring is very limited.

Embodiments herein overcome the constraint of using a limited amount of data in order to train the predictive model to learn the decomposition filters for motion magnification. It provides data augmentation method that generates data using adversarial methods. This provides flexibility for the user to select a configurable number of images for training the model. Increasing the amount of the data leads to much better generalization, and in turn improved accuracy. It also provides the flexibility to give attention to the clustered contour of pixels, which is not supported by conventional motion monitoring and magnification.

Figure 12:
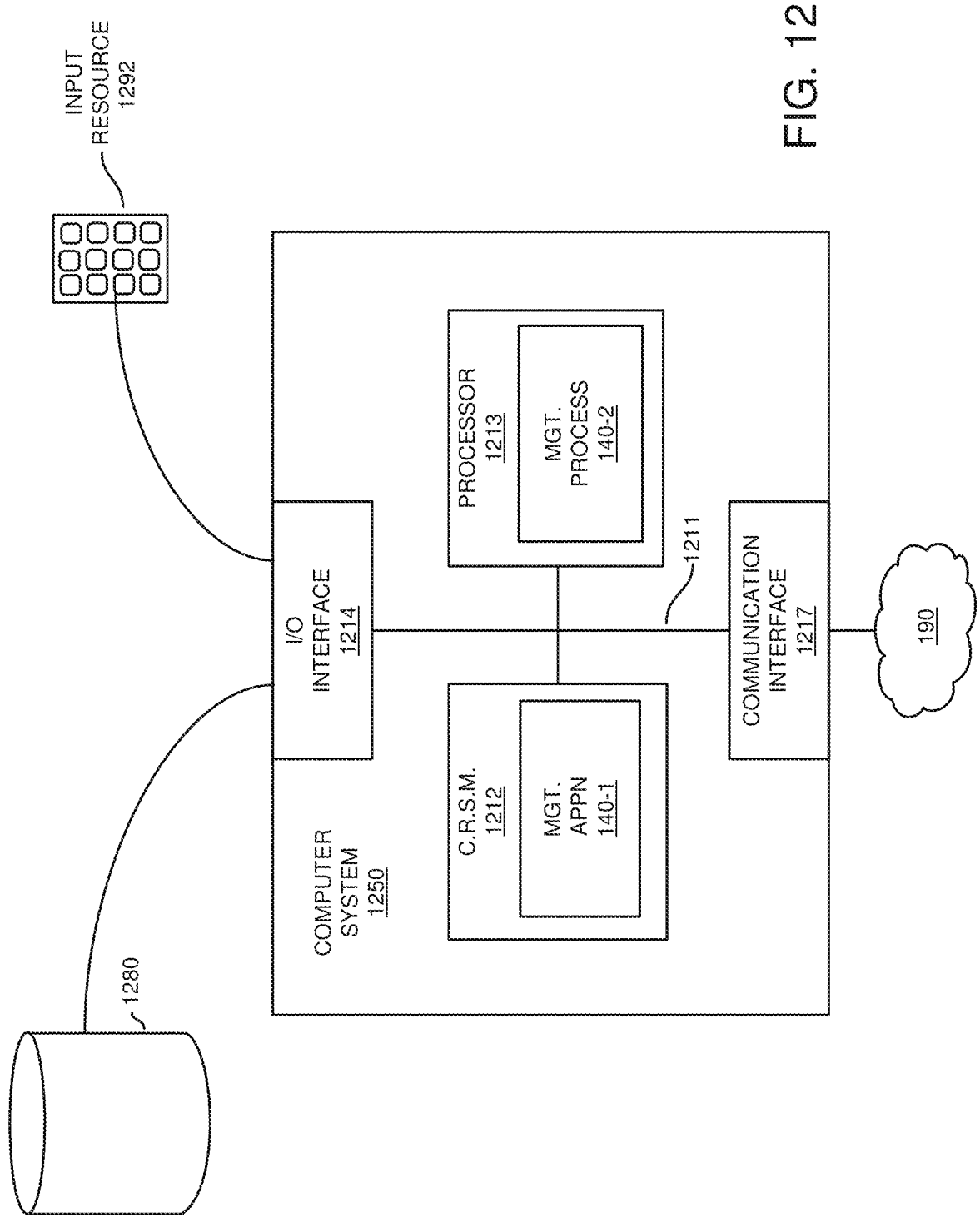
FIG. 12 is an example diagram illustrating example computer hardware and software operable to execute operations according to embodiments herein.

FIG. 12 is an example diagram illustrating example computer hardware and software operable to execute operations according to embodiments herein.

Any of the resources (such as video processing system 100, video processor 140, monitor resource 141, etc.) as discussed herein can be configured to include computer processor hardware and/or corresponding executable (software) instructions to carry out the different operations as discussed herein.

As shown, computer system 1250 of the present example includes an interconnect 1211 coupling computer readable storage media 1212 such as a non-transitory type of media (which can be any suitable type of hardware storage medium in which digital information can be stored and retrieved), a processor 1213 (computer processor hardware), I/O interface 1214, and a communications interface 1217.

I/O interface(s) 1214 supports connectivity to repository 1280 and input resource 1292.

Computer readable storage medium 1212 can be any hardware storage device such as memory, optical storage, hard drive, floppy disk, etc. In one embodiment, the computer readable storage medium 1212 stores instructions and/or data.

As shown, computer readable storage media 1212 can be encoded with management application 140-1 (e.g., including instructions) to carry out any of the operations as discussed herein.

During operation of one embodiment, processor 1213 accesses computer readable storage media 1212 via the use of interconnect 1211 in order to launch, run, execute, interpret or otherwise perform the instructions in in the management application 140-1 stored on computer readable storage medium 1212. Execution of the management application 140-1 (i.e., video processing application) produces management process 140-2 to carry out any of the operations and/or processes as discussed herein.

Those skilled in the art will understand that the computer system 1250 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, wireless communication device, gateway resource, communication management resource, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1250 may reside at any location or can be included in any suitable resource in any network environment to implement functionality as discussed herein.

Functionality supported by the different resources will now be discussed via flowchart in FIG. 13. Note that the steps in the flowcharts below can be executed in any suitable order.

Figure 13:
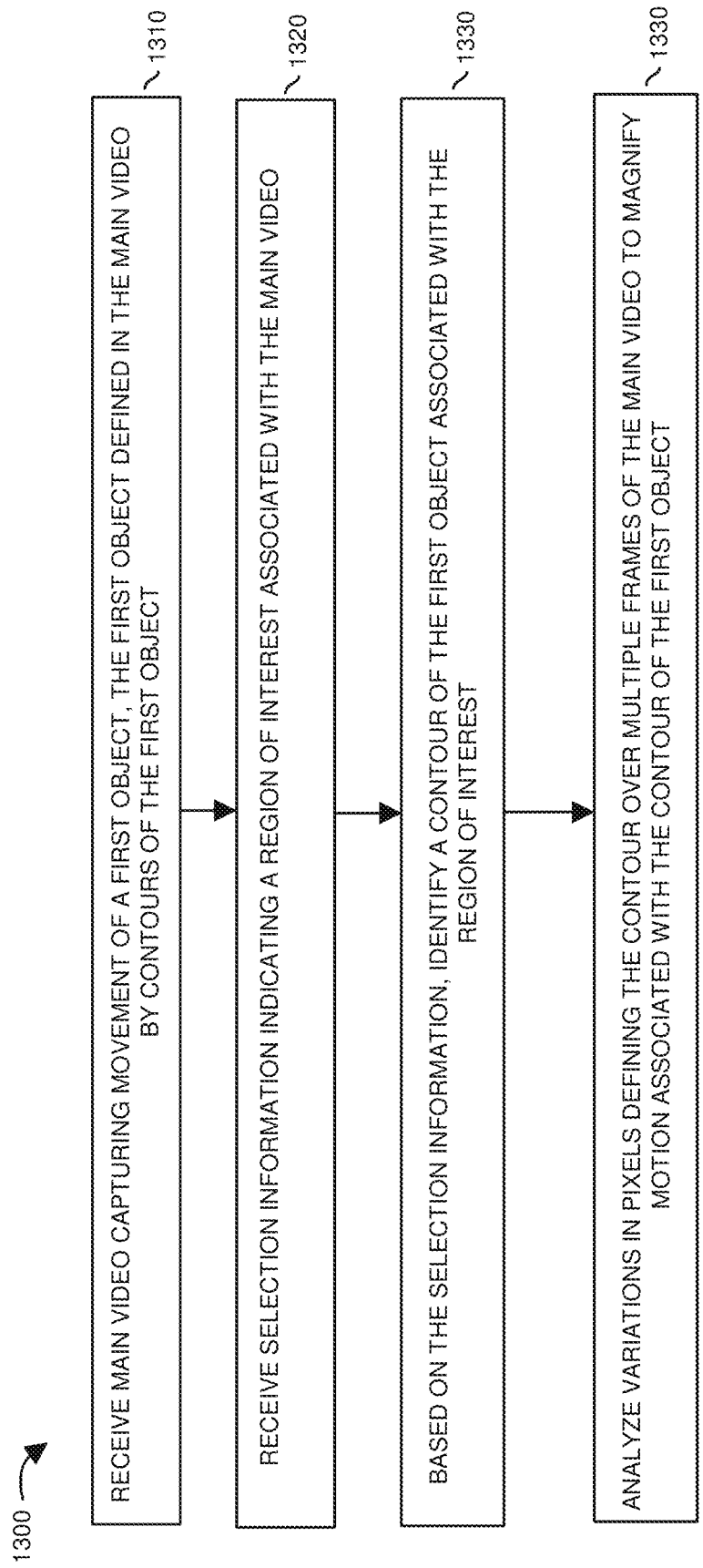
FIG. 13 is an example diagram illustrating a method according to embodiments herein.

FIG. 13 is an example diagram illustrating a method according to embodiments herein.

In processing operation 1310, the video processing system 100 (and/or video processor 140) receives primary video 110 capturing movement of a first object (such as zipper associated with monitored entity 120). The first object (such as entity 120) is defined in the primary video by multiple contours of the first object (entity 120).

In processing operation 1320, the video processing system 100 (and/or video processor 140) receives selection information 105 indicating a contour of interest 121 associated with the first object (entity 120). The contour of interest 121 is one of the multiple contours associated with the first object (entity 120).

In processing operation 1330, based on the selection information 105, the video processing system 100 monitors and magnifies motion associated with the contour of interest 121.

In processing operation 1340, the video processing system 100 analyzes variations in the monitored contour of interest 121 over multiple frames of the primary video 110 to produce magnified motion associated with the monitored contour of interest associated with the first object (entity 120).

Note again that techniques herein are well suited to facilitate collection of information from one or more wireless station and distribution of the information over a network to a communication management resource. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving primary video capturing movement of a first object, the first object defined in the primary video by multiple contours of the first object;
   receiving selection information indicating a contour of interest associated with the first object, the contour of interest being one of the multiple contours of the first object;
   based on the selection information, monitoring the contour of interest;
   analyzing variations in the monitored contour of interest over multiple frames of the primary video to produce magnified motion associated with the monitored contour of interest of the first object; and
   based on analyzing the variations in the monitored contour of interest over the multiple frames, producing an auxiliary video including the magnified motion, the analyzing including determination of a spatial difference between a first rendition of the monitored contour of interest and a second rendition of the monitored contour of interest.

2. The method as in claim 1, wherein the monitored contour of interest is a cluster of pixels; and
   wherein the selection information specifies attributes of the cluster of pixels.

3. The method as in claim 2, wherein a spatial distribution of the cluster of pixels associated with the monitored contour of interest in the primary video vary over time.

4. The method as in claim 1, wherein the monitored contour of interest is disposed on a surface of the first object and is disposed within outermost edge contours of the first object captured by the primary video.

5. A method comprising:
receiving primary video capturing movement of a first object, the first object defined in the primary video by multiple contours of the first object;
monitoring a contour of interest in the primary video;
analyzing variations in the monitored contour of interest over multiple frames of the primary video to produce magnified motion associated with the monitored contour of interest of the first object; and
wherein analyzing the variations in the monitored contour of interest includes:
for a first frame of the primary video, detecting a first rendition of the monitored contour of interest;
for a second frame of the primary video, detecting a second rendition of the monitored contour of interest; and
producing an auxiliary video including the magnified motion based on a spatial difference between the first rendition of the monitored contour of interest in the first frame and the second rendition of the monitored contour of interest in the second frame.

6. The method as in claim 5 further comprising:
producing settings of pixels in the auxiliary video representing the magnified motion, the settings being different than settings of corresponding pixels in the primary video representing the monitored contour of interest.

7. The method as in claim 5, wherein dimensions of a rendition of the magnified motion in the auxiliary video indicate a magnitude of movement of the monitored contour of interest.

8. A method comprising:
receiving primary video capturing movement of a first object, the first object defined in the primary video by multiple contours of the first object;
receiving selection information indicating a contour of interest associated with the first object, the contour of interest being one of the multiple contours of the first object;
based on the selection information, monitoring the contour of interest;
analyzing variations in the monitored contour of interest over multiple frames of the primary video to produce magnified motion associated with the monitored contour of interest of the first object; and
wherein analyzing the variations includes implementing density-based clustering based on standard deviations of pixel settings of a first rendition of the monitored contour of interest in a first frame of the primary video with respect to a second rendition of the monitored contour of interest in a second frame of the primary video.

9. The method as in claim 1 further comprising:
prior to receiving the selection information: i) detecting presence of the multiple contours of the first object in the primary video; and ii) presenting the multiple contours to a user for selection.

10. The method as in claim 9, wherein receiving the selection information includes receiving selection of the contour of interest associated with the first object, the contour of interest selected from the multiple contours presented to the user.

11. The method as in claim 1, wherein receiving the primary video includes receiving a first frame and a second frame of the primary video; and
wherein producing the auxiliary video includes: i) detecting the first rendition of the monitored contour of interest in the first frame; ii) detecting the second rendition of the monitored contour of interest in the second frame; and iii) comparing the first rendition of the monitored contour of interest to the second rendition of the monitored contour of interest to produce the magnified motion of the contour of interest.

12. A system comprising:
video processing hardware operative to:
receive primary video capturing movement of a first object, the first object defined in the primary video by multiple contours of the first object;
receive selection information indicating a contour of interest associated with the first object, the contour of interest being one of the multiple contours of the first object;
based on the selection information, monitor the contour of interest;
analyze variations in the monitored contour of interest over multiple frames of the primary video to produce magnified motion associated with the monitored contour of the first object; and
implement density-based clustering based on standard deviations of pixel settings of first pixels in a first rendition of the monitored contour of interest in a first frame of the primary video with respect to second pixels in a second rendition of the monitored contour of interest in a second frame of the primary video.

13. The system as in claim 12, wherein the monitored contour of interest is a cluster of pixels; and
wherein the selection information specifies attributes of the cluster of pixels.

14. The system as in claim 13, wherein a spatial distribution of the cluster of pixels associated with the monitored contour of interest in the video vary over time.

15. The system as in claim 13, wherein the monitored contour of interest is disposed on a surface of the first object and is disposed within outermost edge contours of the first object captured by the primary video.

16. The system as in claim 12, wherein the video processing hardware is further operative to:
for a first frame of the primary video, detect a first rendition of the monitored contour of interest;
for a second frame of the primary video, detect a second rendition of the monitored contour of interest; and
produce an auxiliary video including the magnified motion based on a spatial difference between the first pixels in the first rendition of the monitored contour of interest and the second pixels in the second rendition of the monitored contour of interest.

17. The system as in claim 16, wherein the video processing hardware is further operative to:
produce settings of pixels in the auxiliary video representing the magnified motion, the settings being different than settings of corresponding pixels in the primary video representing the monitored contour of interest.

18. The system as in claim 16, wherein dimensions of a rendition of the magnified motion in the auxiliary video indicate a magnitude of movement of the monitored contour of interest.

19. The system as in claim 12, wherein the video processing hardware is further operative to:
prior to receiving the selection information: i) detecting presence of the multiple contours of the first object in the primary video; and ii) presenting the multiple contours to a user for selection.

20. The system as in claim 19, wherein the video processing hardware is further operative to:
receive selection of the contour of interest associated with the first object, the contour of interest selected from the multiple contours presented to the user.

21. The system as in claim 12, wherein the video processing hardware is further operative to:
receive a first frame and a second frame of the primary video;
detect a first rendition of the contour of interest in the first frame;
detect a second rendition of the contour of interest in the second frame; and
compare the first rendition of the contour to the second rendition of the contour to produce the magnified motion of the contour.

22. The method as in claim 1, wherein the movement of the first object occurs based on movement of a second object.

23. The method as in claim 1, wherein the spatial difference is determined based on a measurement of movement of a first portion of the contour of interest.

24. The method as in claim 23, wherein the contour of interest extends lengthwise along a first axis; and
wherein the spatial difference is determined based on the measurement of the movement of the first portion of the contour of interest along a second axis.

25. The method as in claim 24, wherein the second axis is orthogonal to the first axis.

26. The method as in claim 1 further comprising:
generating an alarm notification in response to detecting a condition in which a magnitude of the motion associated with the monitored contour of interest is above a threshold level.

27. The method as in claim 1 further comprising:
generating an alarm notification in response to detecting a condition in which a magnitude of the motion associated with the monitored contour of interest is below a threshold level.

28. The method as in claim 1, wherein the magnified motion is cyclical motion within a spatial envelope.

29. The method as in claim 1, wherein the first object is a first color, the method further comprising:
displaying a rendition of the magnified motion to be a second color, the second color being different than the first color.

30. The method as in claim 1, wherein a shape of the contour of interest varies over time.

* * * * *